United States Patent [19]
Anderson et al.

[11] Patent Number: 5,241,433
[45] Date of Patent: Aug. 31, 1993

[54] DISK DRIVE SERVO CONTROL

[75] Inventors: Todd B. Anderson; Mark E. Bofferding; Martin R. Green; Mark D. Hagen, all of Rochester, Minn.; Joseph M. Humel, San Mateo, Calif.; William J. Hunt, Rochester, Minn.; Lawrence P. Segar, Rochester, Minn.; John J. Stephenson, Rochester, Minn.; Michael C. Stich, Rochester, Minn.

[73] Assignee: International Business Machines Corporation, Armonk, N.Y.

[21] Appl. No.: 965,038

[22] Filed: Oct. 22, 1992

Related U.S. Application Data

[63] Continuation of Ser. No. 510,379, Apr. 17, 1990, abandoned.

[51] Int. Cl.[5] .............................................. G11B 5/596
[52] U.S. Cl. ................................. 360/77.04; 360/77.05
[58] Field of Search ............... 360/77.04, 77.05, 77.07, 360/77.08, 77.11; 364/167

[56] References Cited

U.S. PATENT DOCUMENTS

| | | | |
|---|---|---|---|
| 4,136,365 | 1/1979 | Chick et al. | 360/77.04 |
| 4,536,809 | 8/1985 | Sidman | 360/77.04 |
| 4,616,276 | 10/1986 | Workman | 360/77 |
| 4,630,190 | 12/1986 | Alaimo et al. | 364/167 |

Primary Examiner—Aristotelis Psitos
Assistant Examiner—Won Tae C. Kim
Attorney, Agent, or Firm—Roy W. Truelson; Robert W. Lahtinen

[57] ABSTRACT

In a disk storage device dedicated servo system, a reference track is written in the outer guardband of the servo surface and each of the data surfaces. Supplemental position error signal (PES) values are obtained from the difference of servo and data surface samples at a plurality of locations around the disk and stored for access during read/write operations. The supplemental PES values are combined with the dedicated surface PES values to yield a composite PES that more accurately follows the data track centerline of the disk surface being addressed. The supplemental PES values are also periodically updated. To provide a more accurate correction of the composite PES, two consecutive supplemental values are used and an interpolation is calculated to provide a continuously changing supplemental PES value for modification of each sector actuator drive pulse between the two current supplemental PES values. Provision is also made in the apparatus to make the correction technique tolerant of tangential skew that may make tracks unreadable because of early or late timing through the provision of sequences of alternative early and later sample sector sequences.

13 Claims, 10 Drawing Sheets

DISK DRIVE SERVO CONTROL

This application is a continuation of application Ser. No. 07/510,379, filed Apr. 17, 1990, now abandoned.

FIELD OF THE INVENTION

This invention relates to disk storage devices having movable transducer heads and more particularly to an improved servo positioning system for such devices.

BACKGROUND OF THE INVENTION

High performance disk drives use information magnetically written on a disk to determine the position of the read/write heads. There are two methods in common use. One employs an entire disk surface containing exclusively position information. This surface is dedicated to servo information and all heads confronting other surfaces and carried by the same actuator are assumed to follow when the servo surface head is moved from track location to track location. The other of the two methods, sector servo, embeds the servo information on all disk surfaces between the data information. The advantages of dedicated servo are a much higher sample rate and simpler, faster head switching. Both of these features improve drive performance. The major disadvantage is that for files with many disks, shifting occurs between the disks at one end of the stack and disks at the other end of the stack. This effect can be reduced by half by placing the dedicated surface in the center of the stack, which does not solve the problem and further creates other difficulties. In such a structure complex or costly shielding may be required or the surface adjacent the servo surface may not be used for data because of the magnetic coupling that would occur when that surface was being written while the servo is trying to read its information. Another manner used to produce more accurate alignment between the data track and the corresponding data head is to provide a servo reference track on the servo surface and on each data surface. By using the data surface servo information, static and dynamic misregistration between the dedicated and data surfaces can be reduced.

The use of reference tracks to improve track following operations by dynamically modifying the servo control signal with a supplementary PES correction signal is described in U.S. Pat. No. 4,136,365. A misposition error correction servo signal counters a previously measured, cyclic off center transducer alignment error. This signal is obtained by measuring off center track misalignment of each data head at various circumferential positions. Misposition errors at such various circumferential positions are sampled for each head, stored and later recalled and applied to the servo controller during a subsequent read/write operation. This technique holds the supplemental PES correction constant until the next sample time arrives. Although this is simple and involves the least amount of computation, it is inaccurate since the actual PES is changing between samples with the result that limited performance enhancement is obtained.

The purpose of the reference track is to correct for radial mechanical motion. However, there is usually tangential motion as well. Most servo patterns must fall within a narrow timing window in order to be demodulated into a position error signal (PES). If the tangential, mechanical motion is large enough, the servo signal written on the data surface may move out of the timing window and fail to demodulate into a PES signal.

SUMMARY OF THE INVENTION

The servo correction system of the present invention uses servo surface and data surface reference tracks that are used to obtain supplemental PES values associated with a sequence of circumferential positions with respect to each data head. These values are stored and subsequently recalled during read/write operations. However, two consecutive values are recalled and a linear interpolation is applied between samples to cause the data head addressed to more closely approach the actual position error between samples.

To obtain an even more precise correction, the Fourier transform of the data at the frequencies of interest is taken followed by use of the resultant Fourier coefficients to generate a signal that matches the difference signal at those frequencies. This should give the most accurate interpolation, particularly if the differences are taken at a sample rate that is somewhat slow. It is also the most computationally intensive, but realistic since only the DC value and the spindle fundamental frequency are generally important; though some harmonics could be included.

The disk drive as described in the description that follows, has 96 servo samples per reference track with the supplemental PES being obtained at eight peripheral locations or every twelfth sample. The servo demodulator uses a servo ID (SID) as a timing mark which is written immediately before each servo sample to sync up the demodulation logic (which measures the servo wave form and converts it into a position error value). Tangential movement of the disk can cause the SID mark to occur too early or too late. When this happens the demodulated position value is invalid. The electronics could be designed to accommodate large tangential displacement, but this would require extra pad in the write-to-recovery field resulting in an undesirable reduction of drive storage capacity. Since only eight samples are used, there are eleven unused samples intermediate each of the successive utilized samples. By using the first four of each sequence of samples, two consecutive samples are written with the timing of the SIDs aligned with the servo surface SIDs, the third sample is written so that the SID marks occur early and the fourth sample is intentionally written with the SID marks occurring late. Then if the data head or disk develops some negative tangential skew the third sample will have the correct timing and should the data head or the disk develop a positive skew, the fourth sample will have the correct timing. To implement the technique, the reference track update routine is modified so that if while reading the first set of samples, a missing ID is detected, the second samples of each sequence are read, then the third and then the fourth when missing SIDs are still detected. The result is a design that is much more tolerant of tangential motion than other reference track designs.

DETAILED DESCRIPTION

Figure 1:
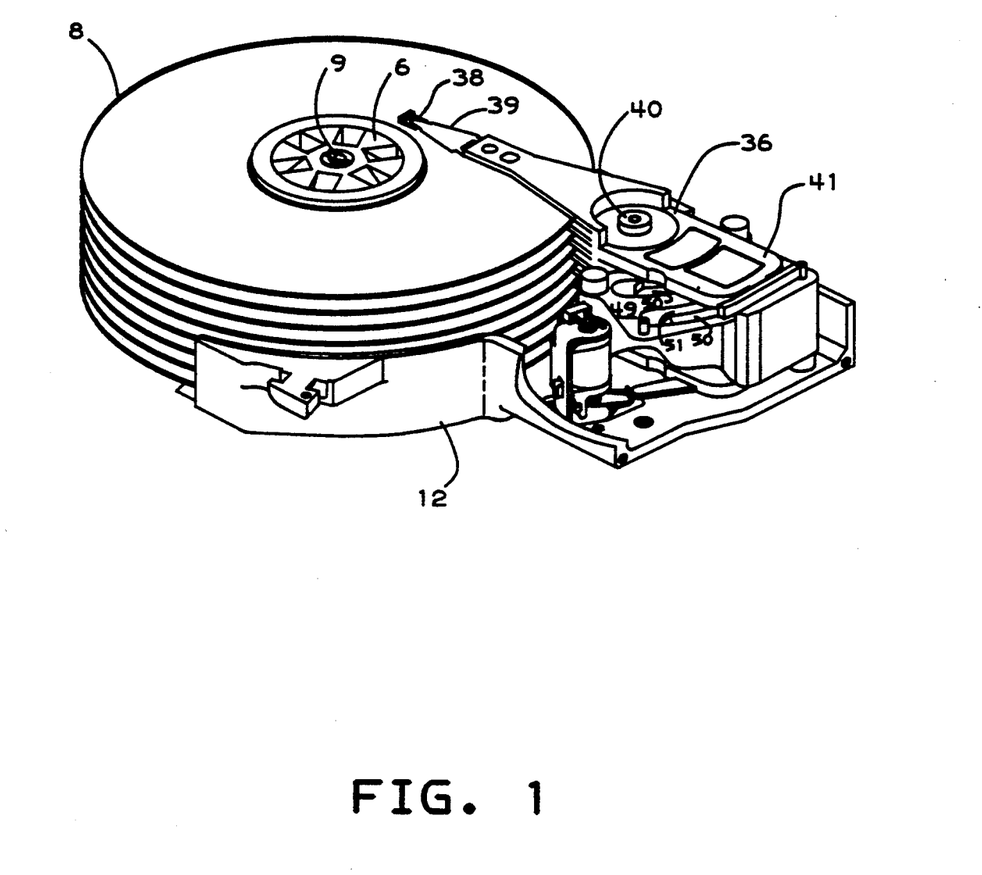
FIG. 1 shows a typical disk drive that may incorporate the present invention with the covers removed and the base partially broken away.
Figure 2:
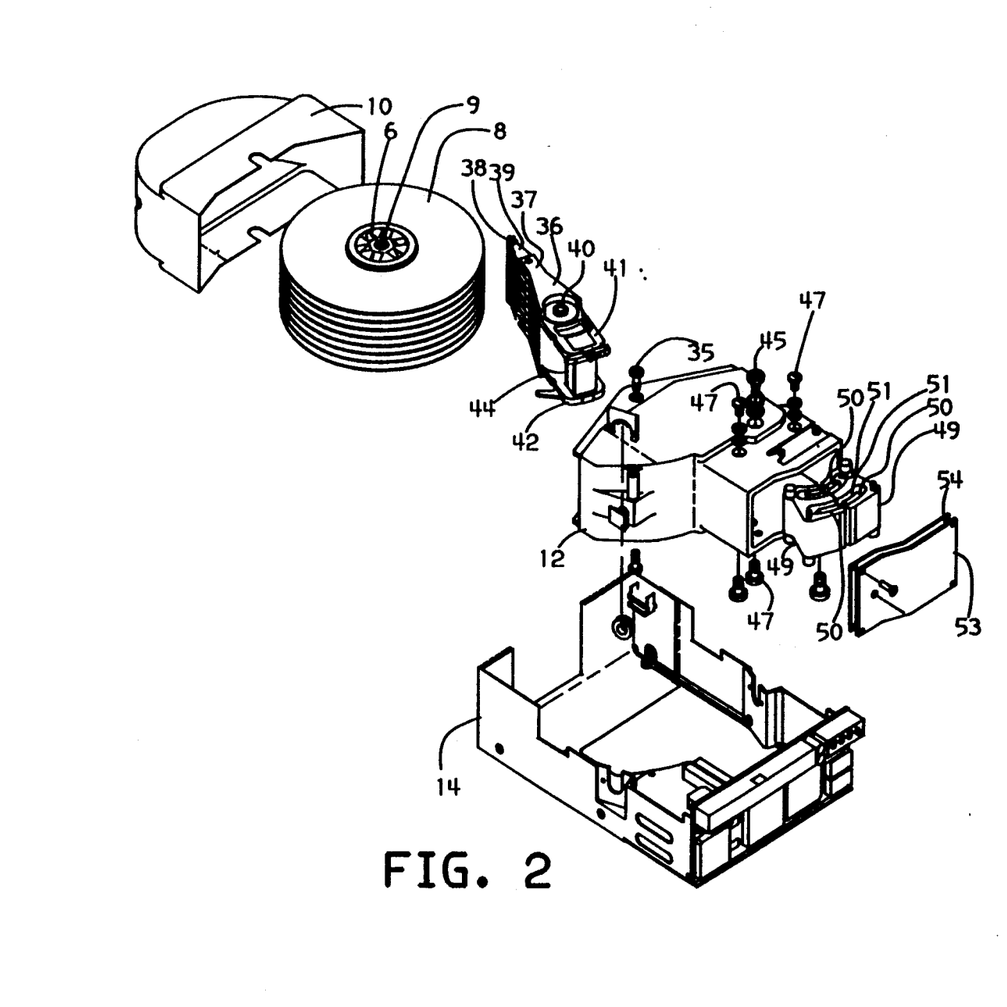
FIG. 2 is an exploded view of the disk drive of FIG. 1.

FIG. 1 with the covers removed and the body casting partially broken away and the exploded view of FIG. 2 illustrate a typical disk drive, showing the organization of the mechanical and electrical elements within the established dimensions and mounted on frame 14. The head and disk assembly is enclosed by body 12 and the covers 10 and 53. The disks 8 are mounted about a hub 6 which contains the spindle motor. The spindle shaft 9, which forms a part of the wound stator of the spindle drive motor, is secured at each end to the body 12 by bolts 35. The actuator pivotable assembly 36 presents a series of arms 37. The upper and lower arms 37 carry a single transducer 38 and resilient suspension 39 which respectively confront the uppermost and lowermost data surfaces of the stack of disks 8 while most intermediate arms that extend between confronting disk surfaces carry two transducer/suspension assemblies respectively confronting both the data surfaces the supporting arm. At the opposites side of the shaft 40, about which the body 36 pivots, projections 41, 42 support coil 44 of the voice coil motor. The actuator shaft 40 is secured to body 12 by an upper bolt 45 and a similar lower bolt. Also mounted on body 12 by a series of bolts 47 are a pair of voice coil motor core elements 49 in the form of members having an E-shaped cross section which abut one another and which have permanent magnets 50 attached thereto. This core assembly provides an air gap 51 across which a magnetic field is maintained and in which the vertically extending stretches of the voice coil 44 are positioned. A cover 53 and gasket 54 are secured to the open end of body 12 to cover and seal the end.

In the disk drive of FIGS. 1 and 2, fourteen data heads and one servo head are mounted on a rotary actuator. Every track of the top servo surface of the uppermost disk is written with a phase encoded servo pattern. There are 96 equally spaced servo samples written around each track of the servo surface. The tracks nearest the outer diameter (OD) and inner diameter (ID) edges of the servo surface have a special pattern written onto the tracks which mark them as guardband areas. User data is stored on the other surfaces of the 8 disks between the guardband regions. An index mark is written in one of the 96 samples on each track of the servo surface. All index marks are radially adjacent one another.

On each of the data surfaces in the OD guardband region five tracks of phase encoded servo pattern are written. This pattern is collectively referred to as as a reference track. The pattern is written such that there are 96 samples with equal angular spacing around the reference track. The first reference track servo sample encountered after index is called sample zero, the second sample is number 1, etc. All samples of like number are written to be vertically aligned.

Figure 5:
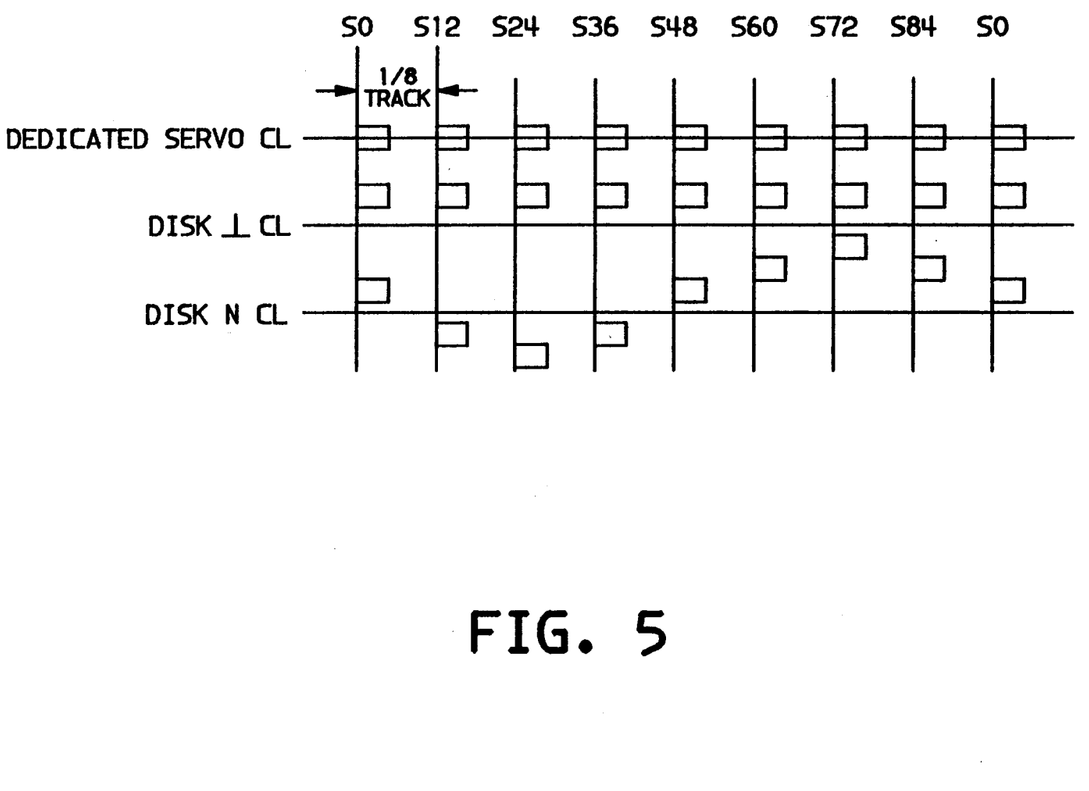
FIG. 5 shows error conditions that may exist as identified by position errors at eight angularly displaced positions about the disk.

The centerline for a data track may move around (radially) relative to the servo track centerline during operation of the disk drive. FIG. 5 illustrates a disk drive wherein the servo transducer is aligned with the centerline of a servo track while data heads 1 and N are misaligned with the centerlines of the corresponding data tracks. The head confronting disk surface 1 has DC displacement from the track centerline, while the head confronting track N has a sinusoidal error through 360 degrees of disk rotation such as occurs when the disk tracks become nonconcentric with the axis of rotation. This misalignment is undesirable and can lead to soft and hard errors. The most desirable data head position is the centerline of the data surface track that is presently being read or written. For a drive with dedicated servo there is no servo position information written in the data fields of the data surfaces so it is not possible to directly follow the data track centerline. However, information from the reference track can be used to dynamically add on an adjustment to the servo surface position sample to correct for the misalignment between the centerlines of the tracks on the two surfaces.

To update the correction values, the drive will periodically be commanded to seek to the location of the reference tracks. While there, a particular data surface is selected and data position samples 0, 12, 24, 36, 48, 60, 72 and 84 are read. Each time a position sample is read the dedicated servo position sample which was read just prior to the data sample is subtracted from the data sample. The reason for computing the difference between the data position value and the dedicated position value is to avoid problems that could occur if the drive were subjected to external vibrations while at the reference track. These differences are saved into 8 memory locations reserved for that surface. Only 8 of the 96 samples are needed to correct for static and dynamic motion caused by the mechanical movement and also use of only 8 samples conserves memory. During the next revolution the same samples are read again, a difference for each sample is again calculated, and the new difference is added to the previous memory location reserved for that sample. This is done for 8 revolutions after which each memory location is divided by 8. The result is that each of the 8 memory locations contain the average for a given sample location (memory location zero contains the average of sample zero etc.).

Figure 3:
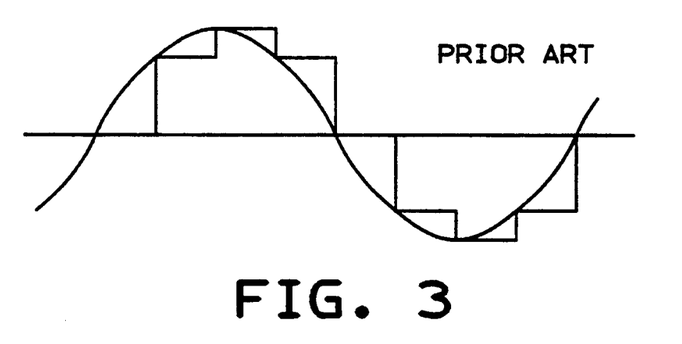
FIG. 3 shows a position error curve and the corrective supplemental position error signal (PES) as practiced in the prior art using reference tracks.
Figure 4:
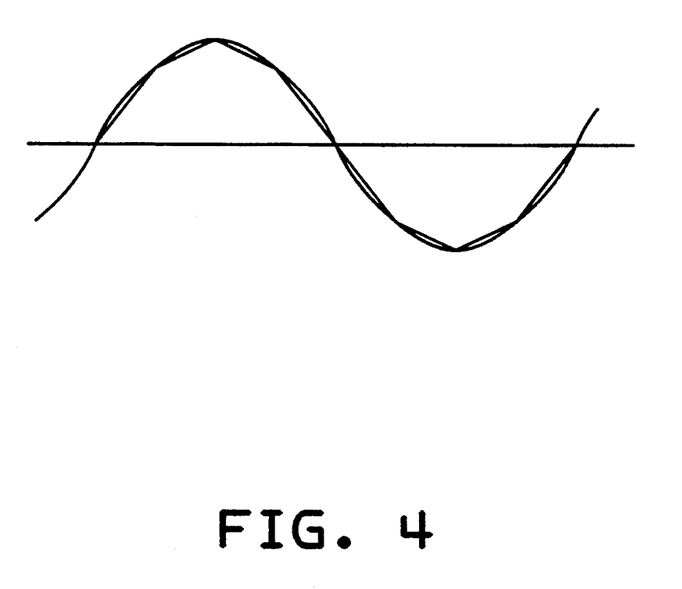
FIG. 4 shows the position error curve of FIG. 3 and the corrective PES using the interpolation technique of the present invention.

When a disk has shifted or another event has occurred that causes the concentric tracks on a data surface to become eccentric with regard to the axis of rotation, there is a sinusoidal or runout error condition. The position error varies during rotation as illustrated by the curves of FIGS. 3 and 4. If the eight supplemental PES values which are calculated and stored in the eight memory locations are applied to the servo PES at the respective rotational positions, the composite PES applied to position the data head causes the data head to follow the stepped path shown in FIG. 3. This reduces the error, but is only correct at the eight memory locations.

Although there are 96 servo surface position samples per revolution, only 8 data surface difference values per revolution are saved. There are 11 servo surface samples between data surface sample zero and data sample 12 and another 11 between data sample 12 and data sample 24 etc. Since the objective is to follow the data surface track centerline and not the servo surface, at the data sample zero location the average value of data samples zero's difference, which is contained in the memory location zero is added to the present reading obtained from the servo surface. This will force the actuator to move to the centerline of the data surface for that particular servo surface sample. Since 11 more servo samples will be received before another data surface sample, it is necessary to add an adjustment to those servo samples as well. The amount of adjustment added is computed by assuming a straight line fit between data sample n and data sample n+1. The straight line will have a slope m and an offset b. Note that the offset b is equal to the value of the sample n in this example. The slope m is the value of sample n+1 minus sample n divided by 12. The adjustment is computed by using the formula for a straight line (y=m*x+b). Y is the adjustment and x is the number of dedicated servo samples minus 1 after data sample n (0–11). For example, assume that the fifth dedicated servo sample after data sample 24 (memory location 3) has just been read. Then b equals the difference value of data sample 24 stored in memory location 3 and a equals the value of data sample 36 stored in memory location 4. Thus:

$$m = (a-b)/12$$

$$x = 4 \text{(fifth servo sample after data sample 24 minus 1)}$$

$$y = \{[(a-b)/12]*4\} + b$$

This procedure is repeated between each data surface sample to correct errors between the position of the servo surface and the data surfaces. The result of this procedure is illustrated in FIG. 4 where the straight line fit between adjacent data track sample positions causes the correction followed to be a series of chords from memory location to memory location. The correction applied thereby much more closely follows the actual position error than the periodic correction shown in FIG. 3.

Figure 6:
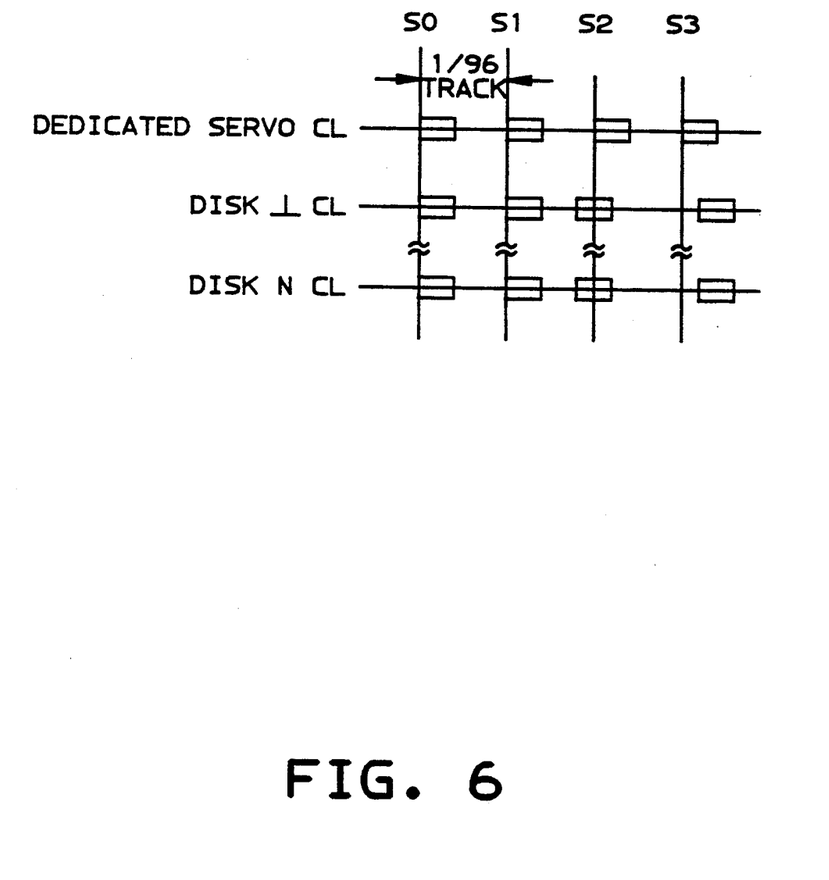
FIG. 6 show the formatting using early and later skewing of sample sectors to implement compensation for tangential skew.

The above correction technique functions well so long as the 8 data surface position samples are good measurements of the data track position. If however, there is also tangential mechanical motion of a data disk relative to the servo disk which causes the data surface position samples to fail to demodulate into a good position measurement, the correction will be invalid. In the present hardware design further compensation is provided where the initial data surface reference track servo sample fails to demodulate. Since there are 96 servo samples on the data surface reference track and only eight are used, there is extra information available. Data samples 0, 1, 12, 13, 24, 25, etc. are written normally and will appear simultaneously with the corresponding servo surface sample if neither the data disk or data head are skewed tangentially with respect to the servo sample position. Data samples 2, 14, 26, 38, 50, 62, 74 and 86 are intentionally written with a positive tangential skew and data samples 3, 15, 27, 39, 51, 63, 75 and 87 are written with a positive tangential skew. This is illustrated in FIG. 6 which shows the first four samples on the disk stack following index. Each of the samples on the servo disk are written normally, to appear on-time. On the data disks designated disks 1 and N, the first two samples, S0 and S1 are written normally, the samples S2 are written to appear early in time and samples S3 are written to appear late in time. Therefore, if neither the primary nor the secondary data samples can be read due to tangential skew, then the samples with positive skew will be read and if they fail the samples with negative skew will be read. The result is a design that is much more tolerant of tangential relative motion than other reference track designs.

Figure 7:
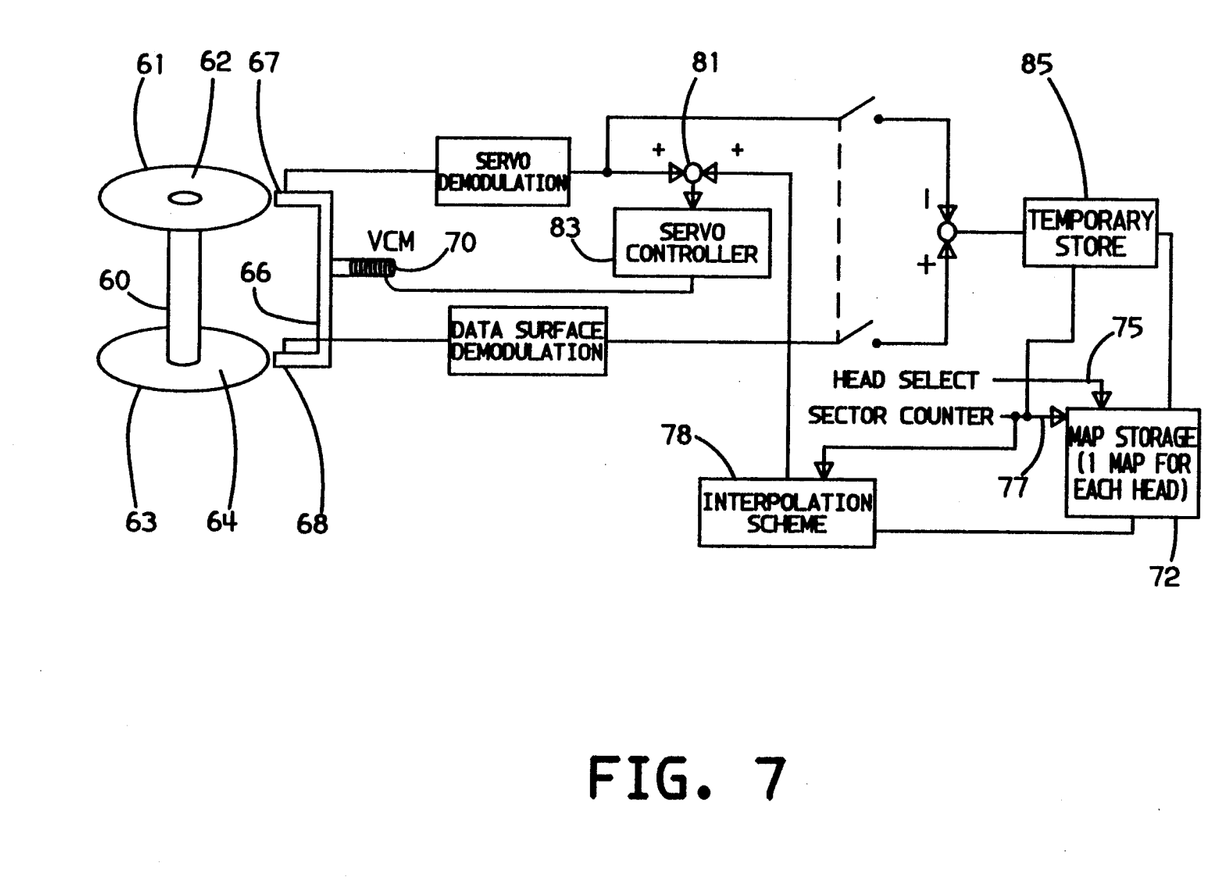
FIG. 7 is a block diagram of the servo apparatus that implements the servo correction technique of the present invention.

FIG. 7 shows the disk drive servo apparatus that implements the servo technique of the present invention. The spindle 60 has a plurality of disks mounted thereon for rotation in unison about a common axis including a dedicated servo disk 61 with a dedicated servo surface 62 and a data disk 63 with a data surface 64. An actuator 66, carries a servo transducer 67 and a data transducer 68 which are driven in unison by a voice coil 70. When data is accessed, the memory 72 which contains the stored maps of eight supplemental PES values for each data transducer is accessed by the head select 75, that identifies the specific map and the sector counter 77, that enables identification of the data surface locations to be utilized. The interpolation circuitry 78 computes the supplemental PES values for each sector time and transmits these values to summing circuit 81. The servo output is demodulated and sent to summing circuit 81 and combined with the supplemental PES value to form the composite PES delivered to the servo controller 83 to determine the magnitude and polarity of the current supplied to voice coil 70.

Figure 8A:
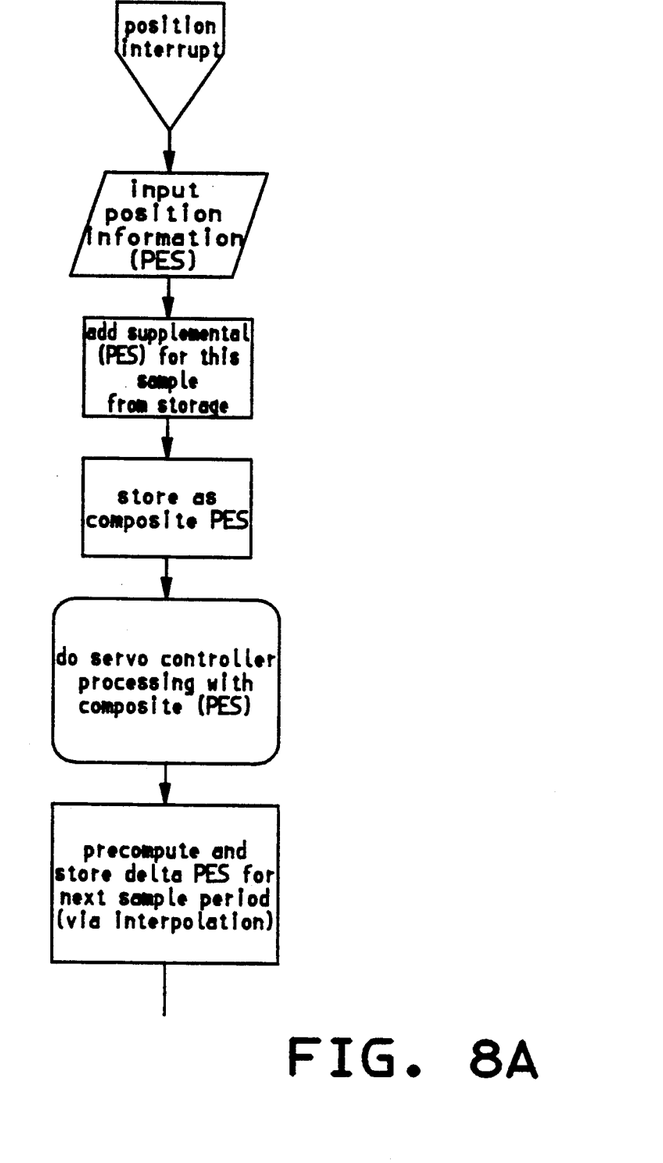
FIG. 8A-8B is a flow chart of the sequence of operations that effects the servo correction.
Figure 8B:
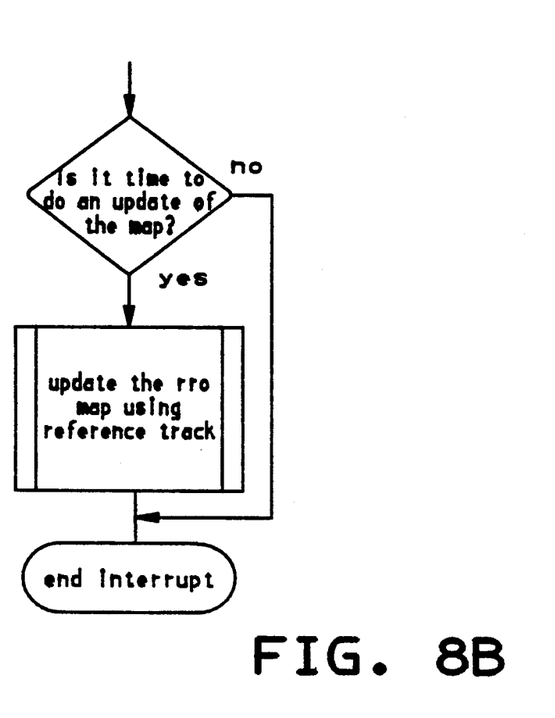

The flow diagram of FIG. 8 illustrates the operational sequence. Upon occurrence of a position interrupt, the position information (PES) is applied and combined with the supplemental PES and stored as a composite PES, to be used for servo control processing. Thereafter the supplemental PES for the next sector sample is computed for each sector time between the current data surface locations. Finally, a decision is made as to whether it is time to update the radial runout (RRO) map using the reference tracks.

When the RRO map is to be updated, The actuator is caused to seek the reference track and the first head is addressed by a head select signal 75. The demodulated servo PES and the demodulated data reference track PES are gated at each of the eight angularly spaced rotational positions and the difference of the values is placed in temporary store 85. When the difference values from eight revolutions have been collected and averaged, the eight values are stored in the map store 72 as the set of supplemental PES values for that head and the process is repeated for the next head.

Figure 9A:
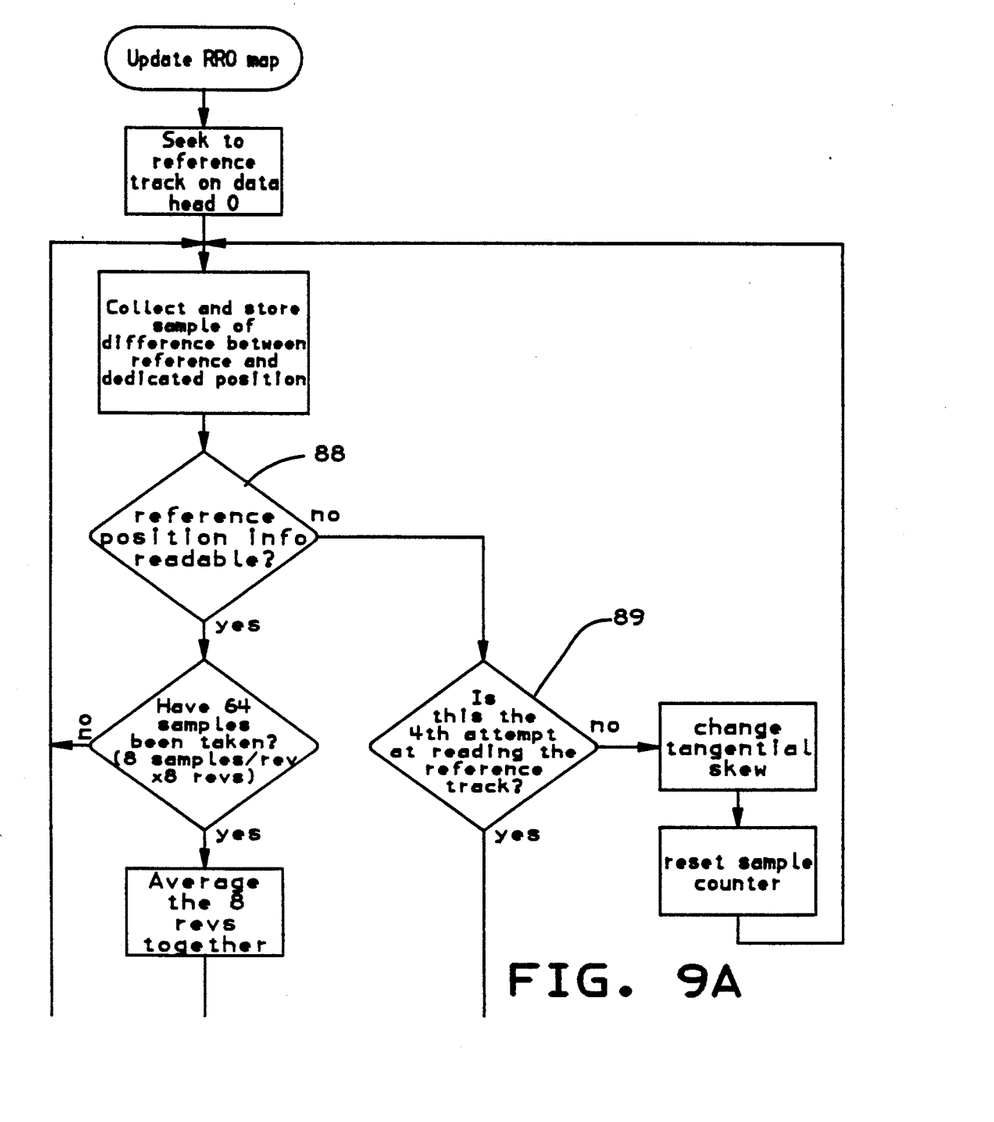
FIG. 9A-9B is a flow chart illustrating the sequence of events when the values in the map storage are updated.
Figure 9B:
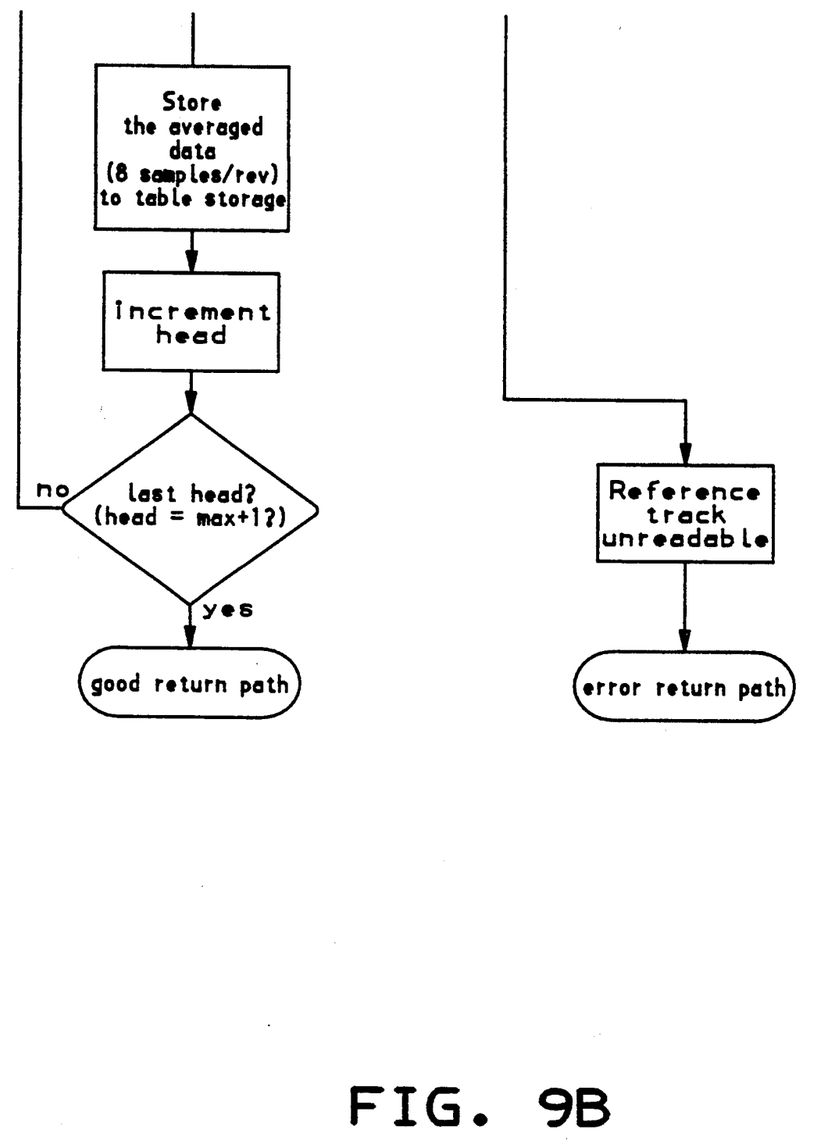

As shown in FIG. 9 the actuator first seeks to the reference track (or cylinder) and addresses data head 0. The difference between servo and reference position samples is calculated and a determination is made as to whether the measurements are valid. If a determination is made that valid data has been obtained, the difference value is stored in temporary storage 85 and the process repeated until 64 difference values are obtained and stored. When 64 difference values are obtained (samples from eight revolutions) the samples are averaged to determine an average difference or supplemental PES value for each of the eight angularly spaced locations and the values are stored in map store 72 as the map values for that head. Thereupon the head address is incremented to the next data head and the process is repeated until all data head maps in the map store have been updated, whereupon the task is completed and the routine is exited.

Should the reference position be unreadable, the NO branch is taken from decision block 88. It is then first determined whether this has been the fourth attempt to read the reference track and if so the routine is exited and an error condition signaled. If the prior attempt is less than the fourth attempt (decision block 89), the system is instructed to read the next successive sample of each sequence of twelve samples, the sample counter is reset and the collection of difference values proceeds as previously described. The command to change the tangential skew effectively directs the system to read the next sample of each sequence of twelve samples as illustrated in FIG. 6. The second attempt is actually a retry of normally timed samples (beginning with sector S1 rather than sector S0). The third attempt uses the third sample of each sequence, beginning with sector S2 which is recorded with early timing and the fourth attempt uses the fourth sample of each sequence beginning with sector S3, which is recorded with late timing.

While the invention has been shown and described with reference to a preferred embodiment thereof, it will be understood by those skilled in the art that various changes in the form and details may be made without departing from the spirit and scope of the invention.

What is claimed is:

1. A disk storage device in which information is stored on concentric tracks on a plurality of disks comprising:
    a dedicated servo surface and a plurality of data surfaces on said plurality of disks;
    a servo transducer associated with said servo surface to read data from said servo surface and a plurality of data transducers respectively associated with said plurality of data surfaces for reading data from and writing data to said data surfaces;
    actuator means which supports said transducers and functions to move said transducers in unison from one concentric track location to another concentric track location;
    a reference servo track on said dedicated servo surface;
    a reference track with servo information on at least one data surface which is aligned with said reference servo track to product no position error signal (PES) when the cooperating data surface is aligned and concentric with said servo surface and said servo transducer is centered over said reference servo track;
    means for generating a plurality of discrete supplemental PES value from information read from said data surface reference track, each of said plurality of supplemental PES values being associated with a respective periodic angularly spaced location on said data surface reference track;
    memory means, coupled to said means for generating a plurality of discrete supplemental PES values, for storing said supplemental PES values;
    means, coupled to said memory means, for producing a supplemental PES, said supplemental PES having values associated with angular locations on said data surface reference track between said periodic angularly spaced locations, said supplemental PES being derived by progressively altering said supplemental PES values stored in said memory means between said periodic angularly spaced locations;
    means for generating a servo PES from information read from said dedicated servo surface;
    means for combining said supplemental PES with said servo PES to produce a composite PES; and
    means for positioning said transducers supported by said actuator means in response to said composite PES.

2. The disk storage device of claim 1 wherein said data surface includes a reference track and said memory means includes an addressable set of supplemental PES value for each said data surface.

3. The data storage device of claim 2 wherein said means for generating a plurality of discrete supplemental PES values generates each supplemental PES value from a difference between said servo PES, wherein said servo PES is generated from reading said reference servo track on said servo surface, and a PES generated from reading the data surface reference track servo information, whereby the supplemental PES is representative of the deviation of the data surface reference track from the servo surface reference track.

4. The disk storage device of claim 3 further comprising means to periodically update the supplemental PES values retained in said memory means.

5. The disk storage device of claim 4 wherein said data surface reference track are disposed in the outer guard band of the respective disk surfaces.

6. The data storage device of claim 2 wherein said means for producing a supplemental PES derives said supplemental PES by linearly changing the supplemental PES values stored in said memory means between successive periodic angularly spaced locations.

7. The disk storage device of claim 1, wherein said data surface reference track comprises:
    a sequence of servo samples at each said respective periodic angularly spaced location on said data surface reference track,
    each sequence of servo samples being associated with a separate sample time on said reference servo track on said dedicated servo surface for reading samples of said sequence,
    each sequence of servo samples including at least one sample which is tangentially skewed with respect to the corresponding sample time on the dedicated surface; and
    said disk storage device further comprises control means for retrying a data surface servo reference track read operation using a second sample of said sequence of servo samples after initially failing to read a first sample.

8. The disk storage device of claim 7,
    wherein said data surface reference track sequence of servo samples each includes (a) a servo sample aligned to appear on-time with respect to the corresponding sample time on the dedicated servo surface, (b) a servo sample that appears early in time with respect to the corresponding sample time on the dedicated servo surface, and (c) a servo sample that appears late in time with respect to the corresponding sample time on the dedicated servo surface; and
    wherein said control means for retrying a data surface servo reference track red operation initially reads an on-time sample of said sequence and, if the sample is not successfully read, thereafter successively reads samples skewed in each direction, terminating such read sequence when a successful read occurs.

9. A servo system for aligning a data transducer with a selected concentric data track on a data disk surface in a disk data storage device wherein a dedicated servo disk surface and a cooperating servo transducer is utilized for track following, comprising:

means for generating a first position error signal (PES) from information read from said dedicated servo disk surface;

a concentric data surface reference track on the data disk surface having said selected concentric data track;

means for reading said data surface reference track and generating a second PES;

means, coupled to said means for reading said data surface reference track and generating a second PES, for deriving a plurality of supplemental PES values from said second PES, each of said plurality of supplemental PES values being representative of a deviation of said data surface reference track from a reference track on said dedicated servo disk surface at a respective periodic, angularly spaced location on said disk surface having said selected concentric data track;

memory means, coupled to said means for deriving a plurality of supplemental PES values, for storing said supplemental PES values;

means, coupled to said memory means, for producing a supplemental PES, said supplemental PES having values associated with angular locations on said data surface reference track between said periodic angularly spaced locations, said supplemental PES being derived by progressively altering said supplemental PES values stored in said memory means between said periodic angularly spaced locations;

means, coupled to said means for producing a supplemental PES, for combining said supplemental PES with said first PES to produce a composite PES; and means for positioning said data transducer in response to said composite PES.

10. The servo system of claim 9 wherein said means for producing said supplemental PES comprises means for establishing a linearly changing supplemental PES from one periodic angularly spaced location to the next successive periodic angularly spaced location.

11. The servo system of claim 10 wherein said dedicated servo surface includes a reference track, and wherein said disk data storage device includes multiple data surfaces each including a reference track which is initially aligned to produce no PES when the servo transducer is aligned with the dedicated surface reference track.

12. The servo system of claim 11 wherein said means for deriving said supplemental PES values comprises means for generating the difference between said first PES and said second PES at each periodic, angularly spaced location.

13. The servo system of claim 12 further comprising a sequence of servo bursts at each data surface reference track periodic location with at least one of said sequence of servo bursts being tangentially time skewed with respect to the other bursts of said sequence.

* * * * *